US009267659B2

(12) United States Patent
Lee

(10) Patent No.: US 9,267,659 B2
(45) Date of Patent: Feb. 23, 2016

(54) VEHICLE LAMP

(71) Applicants: SL Corporation, Daegu (KR); SL Seobong, Cheonan-si, Chungcheongnam-do (KR)

(72) Inventor: Kun Woo Lee, Gyeongsangbuk-Do (KR)

(73) Assignees: SL CORPORATION, Daegu (KR); SL SEOBONG, Cheonan, Chungcheongnam-do (KR)

( * ) Notice: Subject to any disclaimer, the term of this patent is extended or adjusted under 35 U.S.C. 154(b) by 171 days.

(21) Appl. No.: 13/865,648

(22) Filed: Apr. 18, 2013

(65) Prior Publication Data

US 2013/0301290 A1 Nov. 14, 2013

(30) Foreign Application Priority Data

May 14, 2012 (KR) ........................ 10-2012-0051004
Dec. 20, 2012 (KR) ........................ 10-2012-0149220

(51) Int. Cl.
*B60Q 1/04* (2006.01)
*F21S 8/10* (2006.01)

(52) U.S. Cl.
CPC ............... *F21S 48/32* (2013.01); *F21S 48/115* (2013.01); *F21S 48/1109* (2013.01); *F21S 48/1154* (2013.01); *F21S 48/212* (2013.01); *F21S 48/215* (2013.01); *F21S 48/328* (2013.01)

(58) Field of Classification Search
CPC .. B60Q 1/0483; F21S 48/1122; F21S 48/115; F21S 48/1154; F21S 48/15; F21S 48/155; F21S 48/211; F21S 48/215; F21V 19/001; F21V 19/003; F21V 19/0035; F21V 19/004; F21V 19/0045; F21V 29/2206; F21V 29/225; F21V 29/2275; F21W 2101/10
See application file for complete search history.

(56) References Cited

U.S. PATENT DOCUMENTS

| | | | | |
|---|---|---|---|---|
| 7,832,913 | B2 | 11/2010 | Biarne et al. | |
| 7,982,308 | B2 * | 7/2011 | Sheu et al. | 257/727 |
| 2009/0154180 | A1 * | 6/2009 | Cho et al. | 362/459 |
| 2010/0110636 | A1 * | 5/2010 | Chou | 361/702 |
| 2010/0302777 | A1 | 12/2010 | Knoll et al. | |
| 2011/0058387 | A1 * | 3/2011 | Matsunaga et al. | 362/547 |
| 2011/0128754 | A1 | 6/2011 | Aiso et al. | |

FOREIGN PATENT DOCUMENTS

| | | | |
|---|---|---|---|
| CN | 101836040 | A | 9/2010 |
| DE | 203 14 664 | U1 | 12/2003 |
| EP | 1 684 003 | B1 | 7/2006 |

(Continued)

*Primary Examiner* — Julie Bannan

(74) *Attorney, Agent, or Firm* — Mintz Levin Cohn Ferris Glovsky and Popeo, P.C.; Kongsik Kim; Colleen H. Witherell

(57) ABSTRACT

A vehicle lamp that includes components structured to be simply coupled to each other. The vehicle lamp includes a light source unit that emits light, a metal plate onto which the light source unit is mounted on a surface thereof and dissipates heat generated from the light source unit, and a fixing plate that is coupled to the metal plate and supports the metal plate. A coupling protrusion is formed on any one of the metal plate and the fixing plate, a coupling groove coupled to the coupling protrusion is formed in the other one of the metal plate and the fixing plate, and the metal plate includes two or more walls that face each other and a connection surface which connects the walls.

9 Claims, 15 Drawing Sheets

(56) References Cited

FOREIGN PATENT DOCUMENTS

| | | | |
|---|---|---|---|
| EP | 2 096 685 | A1 | 9/2009 |
| JP | 2011-060458 | A | 3/2011 |
| JP | 2011-119168 | A | 6/2011 |
| KR | 10-2011-0021474 | A | 3/2011 |

* cited by examiner

20

VEHICLE LAMP

CROSS-REFERENCE TO RELATED APPLICATIONS

This application claims priority to Korean Patent Application No. 10-2012-0051004 filed on May 14, 2012 and Korean Patent Application No. 10-2012-0149220 filed on Dec. 20, 2012, which applications are incorporated herein by reference in its entirety.

BACKGROUND

1. Technical Field

The present invention relates to a vehicle lamp, and more particularly, to a vehicle lamp that includes components structured to be simply coupled to each other.

2. Background Art

Generally, a vehicle is equipped with a plurality lamps to enable the driver of the vehicle to detect objects while driving at night and the lights inform other vehicles and road users of the vehicle's driving state.

Headlamps installed at the front of the vehicle are designed to illuminate the road ahead and should be bright enough to enable the driver to detect obstacles about 100 meters in front of the vehicle at night or in poor lighting conditions. In addition, taillights installed at the rear of the vehicle are designed to inform following vehicles of the location of the vehicle at night or in poor lighting conditions. Brake lights are also installed at the rear of the vehicle to inform the following vehicles that the vehicle is slowing down. The headlamps emit white visible light, and the taillights and the brake lights emit red light.

In a conventional vehicle lamp, a plastic bracket is used to couple components such as a light source, a printed circuit board (PCB), a heat sink, etc. Specifically, the plastic bracket and the heat sink are coupled to each other by inserting a rib of the plastic bracket into an aperture formed in the heat sink. Then, the rib is inserted sequentially into an aperture formed in an aluminum plate and an aperture formed in a flexible PCB to couple the heat sink, the aluminum plate, and the flexible PCB to the plastic bracket. Furthermore, the rib is melted with heat using, e.g., an iron. As the rib melts, the rib spreads laterally to harden, thereby fixing the heat sink, the aluminum plate and the flexible PCB to the plastic bracket. Finally, a reflective mirror, a lens, etc., are coupled to the plastic bracket by, e.g., screws. As a result, the vehicle lamp is completed.

The above coupling structure of the conventional vehicle lamp requires a process using heat. Thus, the entire process of manufacturing the vehicle lamp becomes complicated. In addition, since an additional part (such as the plastic bracket) designed only for coupling parts is required, thus, increasing manufacturing costs.

SUMMARY

The present invention provides a vehicle lamp that includes components which may be coupled without using an additional part designed only for coupling the components or without a process using heat.

However, aspects of the present invention are not restricted to the description set forth herein. The above and other aspects of the present invention will become more apparent to one of ordinary skill in the art to which the present invention pertains by referencing the detailed description of the present invention given below.

According to an aspect of the present invention, a vehicle lamp may include: a light source unit that emits light; a metal plate onto which the light source unit is mounted on a surface thereof dissipates heat generated from the light source unit; and a fixing plate which is coupled to the metal plate and supports the metal plate, wherein a coupling protrusion is formed on any one of the metal plate and the fixing plate, a coupling groove coupled to the coupling protrusion is formed in the other one of the metal plate and the fixing plate, and the metal plate may include two or more walls which face each other and a connection surface which connects the walls.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
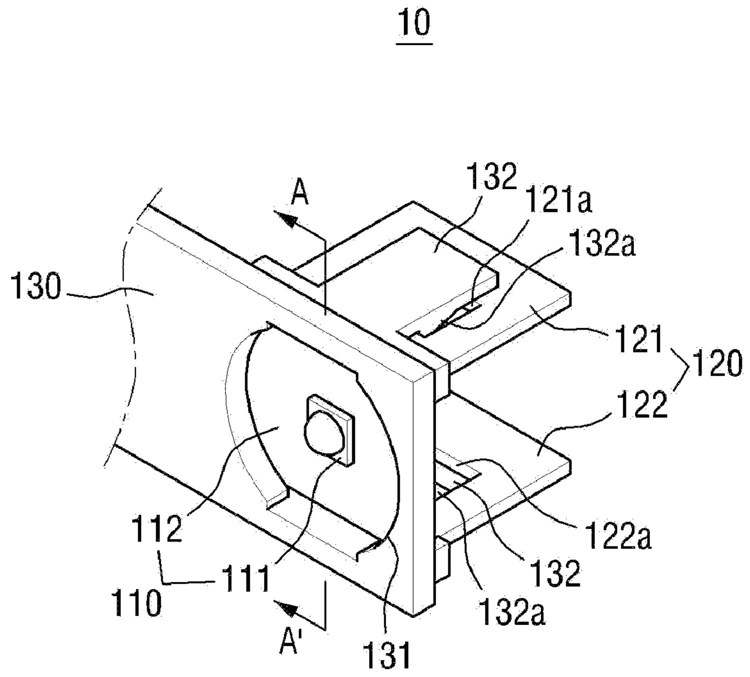
FIG. 1 is an exemplary view of a vehicle lamp according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

Unless specifically stated or obvious from context, as used herein, the term “about” is understood as within a range of normal tolerance in the art, for example within 2 standard deviations of the mean. “About” can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term “about.”

The present invention will now be described more fully with reference to the accompanying drawings, in which exemplary embodiments of the invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the accompanying claims. Like reference numerals refer to like components throughout the specification.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, vehicle lamps according to exemplary embodiments of the present invention will be described with reference to the attached drawings.

Figure 2:
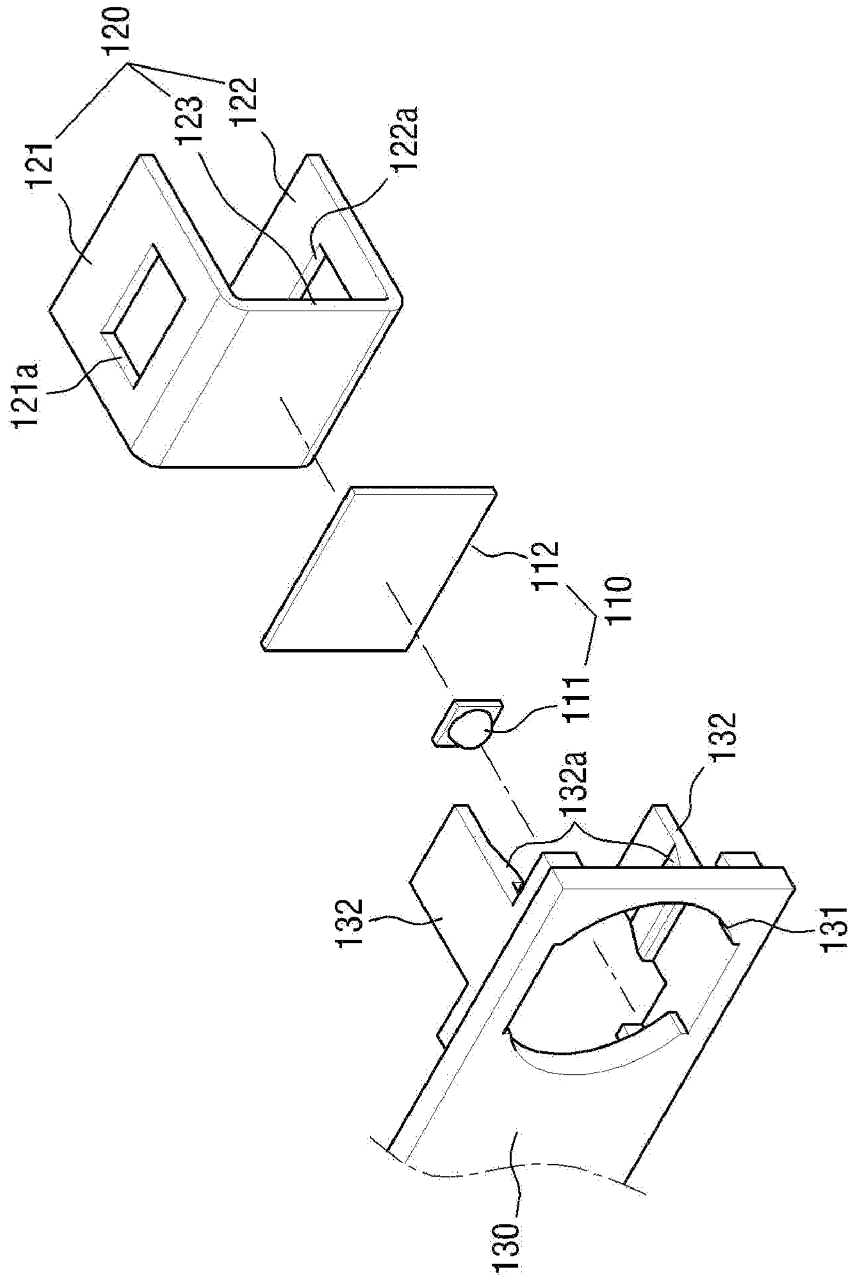
FIG. 2 is an exemplary detailed view of the vehicle lamp according to an exemplary embodiment of the present invention.

FIG. 1 is an exemplary view of a vehicle lamp 10 according to a first exemplary embodiment of the present invention. FIG. 2 is an exemplary detailed view of the vehicle lamp 10 according to the first exemplary embodiment of the present invention. Referring to FIGS. 1 and 2, the vehicle lamp 10 may include a light source unit 110, a metal plate 120, and a fixing plate 130.

The light source unit 110 may be configured to generate and emit light and may be mounted on a surface of the metal plate 120. The light source unit 110 may include of a light source 111 that operates as a source configured to generate and emit light and a printed circuit board (PCB) 112 onto which the light source 111 may be mounted. The PCB 112 may be configured to fix the light source 111 and operate the light source 111 by applying a predetermined voltage to the light source 111.

Since the light source unit 110 is mounted on the metal plate 120, heat generated from the light source unit 110 when the light source unit 110 is turned on may be effectively transferred to the metal plate 120. The heat transferred to the metal plate 120 may be dissipated to the exterior of the vehicle lamp 10 through the metal plate 120 having a substantially large surface area which contacts air. As a result, the metal plate 120 may operate as a heat sink.

The light source 111 may be a light-emitting diode (LED) device which is a semiconductor light emitting device. The LED device used as the light source 111 has low power consumption and superior durability which are typical properties of a semiconductor light emitting device. In addition, due to a substantially small size, the LED device may be installed in a substantially small space compared to a headlight such as a signal lamp.

The light source unit 110 may be mounted on the metal plate 120 by the PCB 112 which is mounted on the metal plate 120 to contact the surface of the metal plate 120. The light source 111 may be mounted on the PCB 112 and supplied with a driving voltage. The PCB 112 may be attached to the metal plate 120 or may be fixed to the metal plate 120 by coupling members such as screws. When the PCB 112 is attached to the metal plate 120, an adhesive interposed between the PCB 112 and the surface of the metal plate 120 may be a type of thermal interface material (TIM). In this case, the TIM may fill a gap between the PCB 112 and the surface of the metal plate 120. Thus, heat generated from the light source 111 may be transferred more effectively to the metal plate 120.

As described above, the metal plate 120 may be coupled directly to the light source unit 110 and thus may receive heat generated by the light source unit 110. Since the metal plate 120 is formed of a metal with a high thermal conductivity, the heat transferred to a portion of the metal plate 120 which contacts the light source unit 110 may be transferred to substantially the entire metal plate 120. As a result, the entire surface of the metal plate 120 may exchange heat with air, thereby dissipating the heat generated by the light source unit 110 to the exterior of the vehicle lamp 10.

In the first exemplary embodiment of the present invention, the metal plate 120 may fix the light source unit 110 and may operate as a heat sink. In addition, since the metal plate 120 is coupled to the fixing plate 130 by a simple coupling structure, it may be easily and simply fixed in the vehicle lamp 10. As a result, the ease of assembly of the vehicle lamp 10 may be improved, and a compact vehicle lamp may be constructed by a simple structure composed of the light source unit 110 and the metal plate 120 that operates as a heat sink.

The metal plate 120 may be made of aluminum or an aluminum alloy which has a high thermal conductivity and is substantially lightweight. Due to these properties, aluminum or an aluminum alloy enables the metal plate 120 to have an enhanced heat dissipation effect by increasing thermal conductivity inside the metal plate 120 and enables the metal plate 120 to be stably fixed to the fixing plate 130.

The metal plate 120 may be bent in a '⊏' shape. Thus, the metal plate 120 may include two walls 121 and 122 which face each other and a connection surface 123 which connects the two walls 121 and 122. When bent in a '⊏' shape, the area of the surface of the metal plate 120 which contacts air in a substantially small space may increase. Accordingly, the heat dissipation performance of the metal plate 120 may be improved.

In the first exemplary embodiment of the present invention, the metal plate 120 may include two walls 121 and 122 as an example. However, this is merely an example used to help understand the present invention, and the present invention is not limited to this case. That is, the metal plate 120 may have one or more walls.

In addition, the light source unit 110 may be mounted on the connection surface 123, and the walls 121 and 122 may be coupled to the fixing plate 130. That is, the light source unit 110 and the fixing plate 130 may be mounted on and coupled to different surfaces of the metal plate 120, thus forming efficient coupling structures.

In the first exemplary embodiment of the present invention, heat dissipation may be accomplished by the metal plate 120 having a '⊏' shape an example. However, the present invention is not limited to such a construction, and the metal plate

Figure 3:
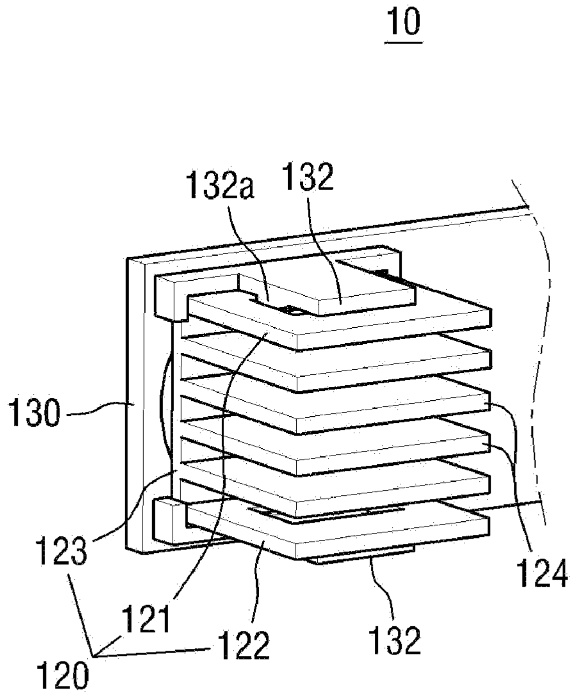
FIG. 3 is an exemplary view of heat dissipation pins formed on a metal plate according to an exemplary embodiment of the present invention.

120 may further include a plurality of heat dissipation pins 124 formed between the two walls 121 and 122 to protrude from the connection surface 123, as shown in FIG. 3. In particular, the heat dissipation pins 124 may further increase the area of the surface of the metal plate 120 which contacts air. As a result, the heat dissipation performance of the metal plate 120 may be further improved.

The fixing plate 130 coupled to the metal plate 120 may support the metal plate 120. The fixing plate 130 may be a portion of a bezel or housing of the vehicle lamp 10 or may be fixed to the bezel or housing of the vehicle lamp 10 as a separate part to allow the light source unit 110 and the metal plate 120 that operates as a heat sink to be assembled with other members of the vehicle lamp 10.

An aperture 131 may be formed in the fixing plate 130, and the metal plate 120 and the fixing plate 130 may be coupled to each other to allow the light source unit 110 to be inserted into the aperture 131. In particular, when the metal plate 120 is coupled to the fixing plate 130 from behind the fixing plate 130, light emitted from the light source unit 110 may pass through the aperture 131 of the fixing plate 130 to be projected in a forward direction. The coupling structure of the metal plate 120 and the fixing plate 130 according to the first exemplary embodiment of the present invention will now be described in detail.

Figure 4:
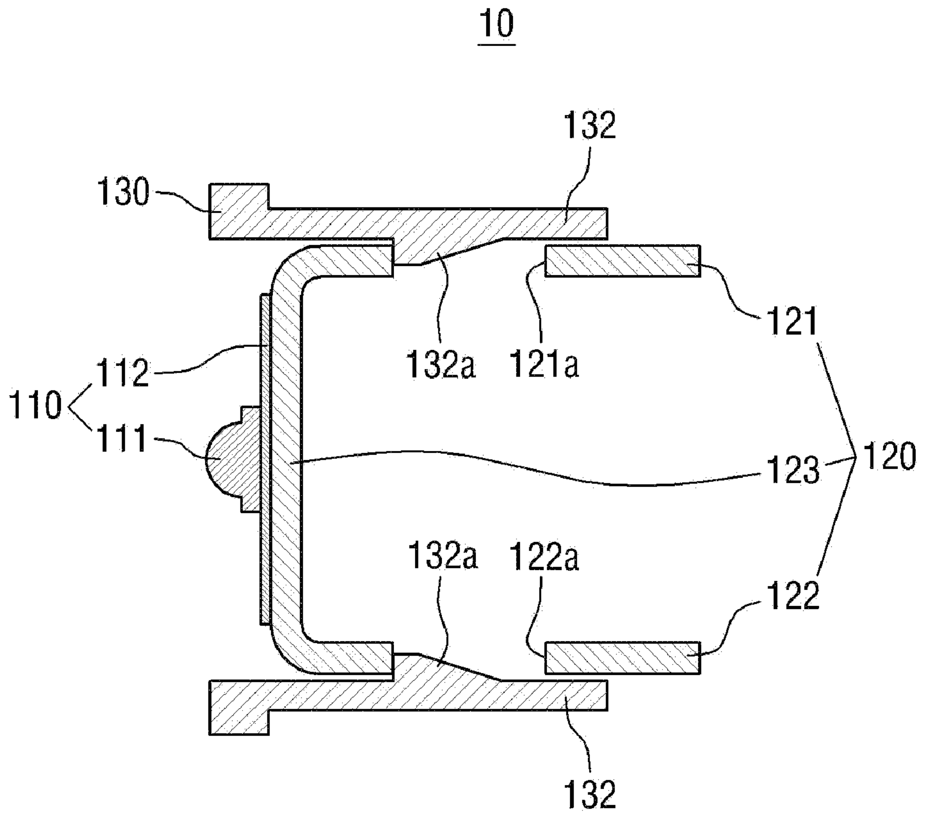
FIGS. 4 and 5 are exemplary cross-sectional views of the vehicle lamp according to an exemplary embodiment of the present invention.
Figure 5:
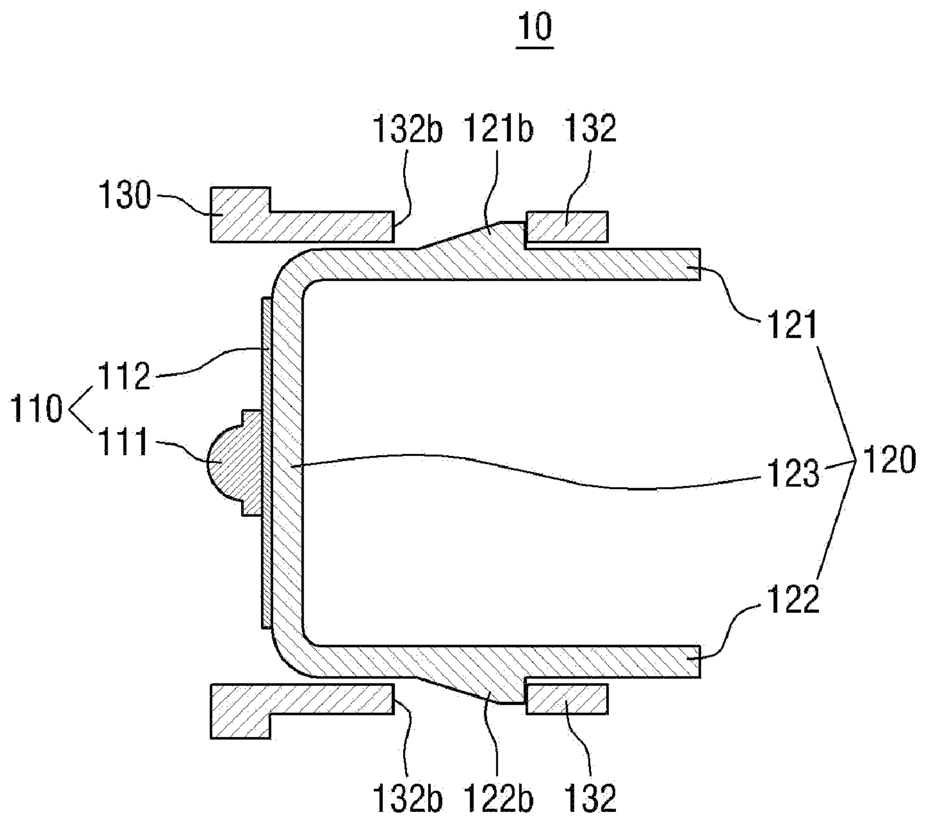

FIGS. 4 and 5 are exemplary cross-sectional views of the vehicle lamp 10 according to the first exemplary embodiment of the present invention, taken along line A-A' of FIG. 1. Referring to FIGS. 4 and 5, the metal plate 120 and the fixing plate 130 may be easily coupled by coupling protrusions (132*a* or 121*b* and 122*b*) and coupling grooves (132*b* or 121*a* and 122*a*).

First, referring to FIG. 4, hook shaped coupling protrusions 132*a* may be formed on the fixing plate 130, and coupling grooves 121*a* and 122*a* into which the coupling protrusions 132*a* are inserted may be formed in the metal plate 120. The metal plate 120 on which the light source unit 110 is mounted may be easily coupled to the fixing plate 130 by the coupling grooves 121*a* and 122*a* and the coupling protrusions 132*a* inserted into the coupling grooves 121*a* and 122*a*.

The fixing plate 130 may include a pair of elastic supports 132 that protrude perpendicularly from a surface (e.g., a rear surface) thereof. The metal plate 120 may be inserted between the pair of elastic supports 132 from behind the fixing plate 130 to be coupled to the elastic supports 132. When the metal plate 120 is bent in a 'ㄷ' shape, the metal plate 120 may be installed to allow the two walls 121 and 122 of the metal plate 120 to contact the elastic supports 132, respectively. Accordingly, the two walls 121 and 122 of the metal plate 120 may be coupled to the elastic supports 132, respectively. The coupling protrusions 132*a* may respectively be formed on the elastic supports 132, and the coupling grooves 121*a* and 122*a* may respectively be formed in the two walls 121 and 122 of the metal plate 120.

In the first exemplary embodiment of the present invention, a pair of elastic supports 132 may be formed since the metal plate 120 has two walls 121 and 122 as an example. However, the present invention is not limited to this configuration, and the number of elastic supports 132 may vary according to the number of walls of the metal plate 120.

Since the elastic supports 132 have elasticity, the position of an end of each of the elastic supports 132 may change within a certain range. Therefore, when the metal plate 120 is pushed into the space between the elastic supports 132, the elastic supports 132 may deform and then return to an original shape to allow the coupling protrusions 132*a* to be easily inserted into the coupling grooves 121*a* and 122*a* of the metal plate 120.

In FIG. 4, the coupling protrusions 132*a* may be formed on the fixing plate 130, and the coupling grooves 121*a* and 122*a* may be formed in the metal plate 120. However, the present invention is not limited to this case, and the opposite case is also possible. For example, referring to FIG. 5, hook shaped coupling protrusions 121*b* and 122*b* may be formed on the metal plate 120, and coupling grooves 132*b* into which the coupling protrusions 121*b* and 122*b* are inserted may be formed in the fixing plate 130. In FIG. 5, the coupling grooves 132*b* may respectively be formed in the pair of elastic supports 132 of the fixing plate 130, and the coupling protrusions 121*b* and 122*b* may respectively be formed on the two walls 121 and 122 of the metal plate 120. The metal plate 120 may be inserted between the pair of elastic supports 132 and thus coupled to the pair of elastic supports 132.

Figure 6:
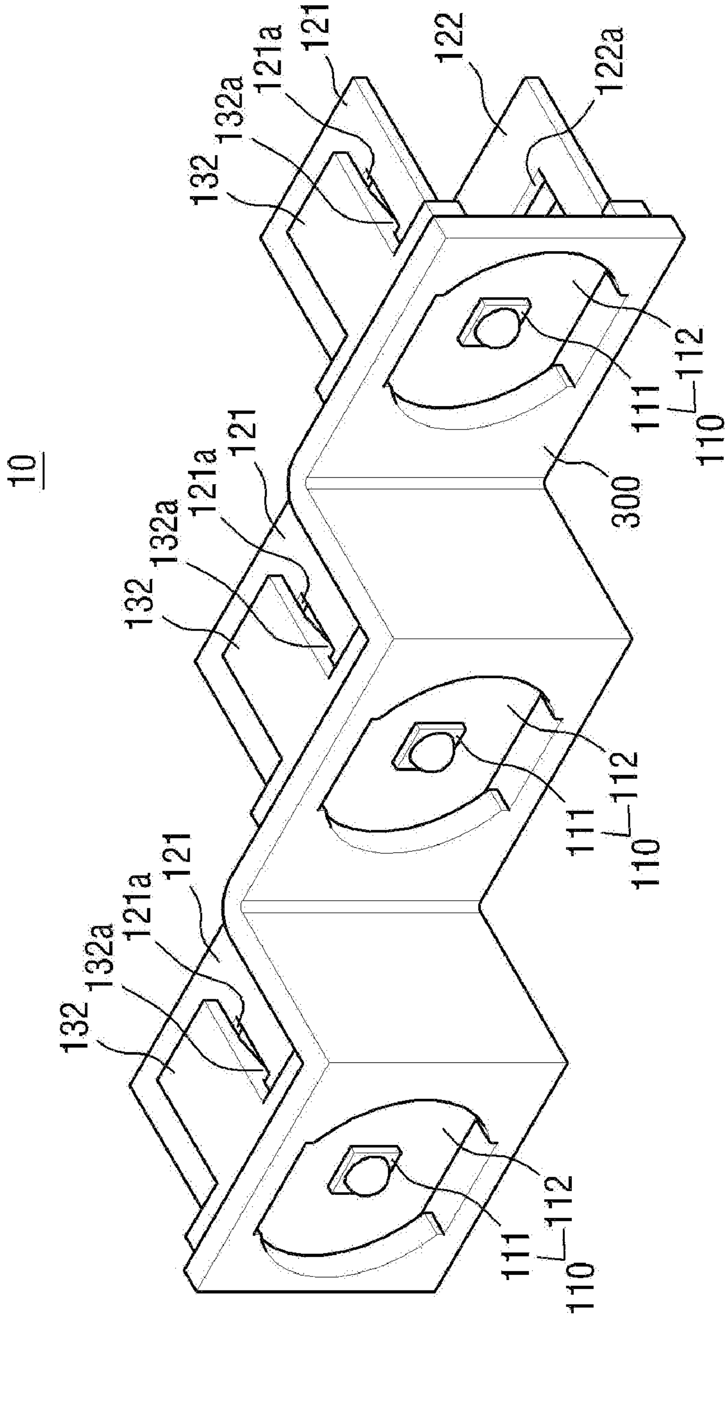
FIGS. 6 through 8 are exemplary views of the vehicle lamp including a plurality of metal plates and a fixing plate according to an exemplary embodiment of the present invention.
Figure 7:
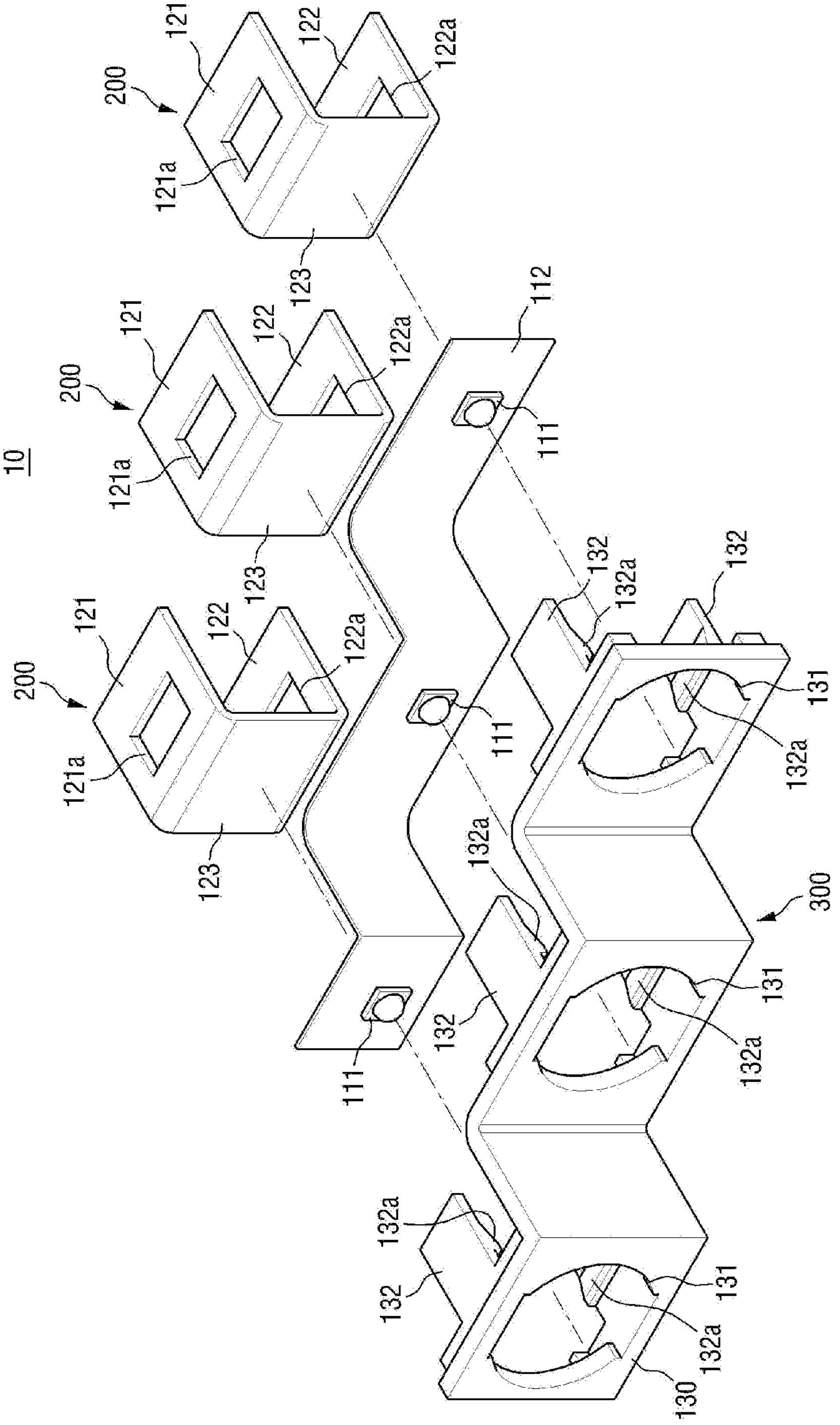
Figure 8:
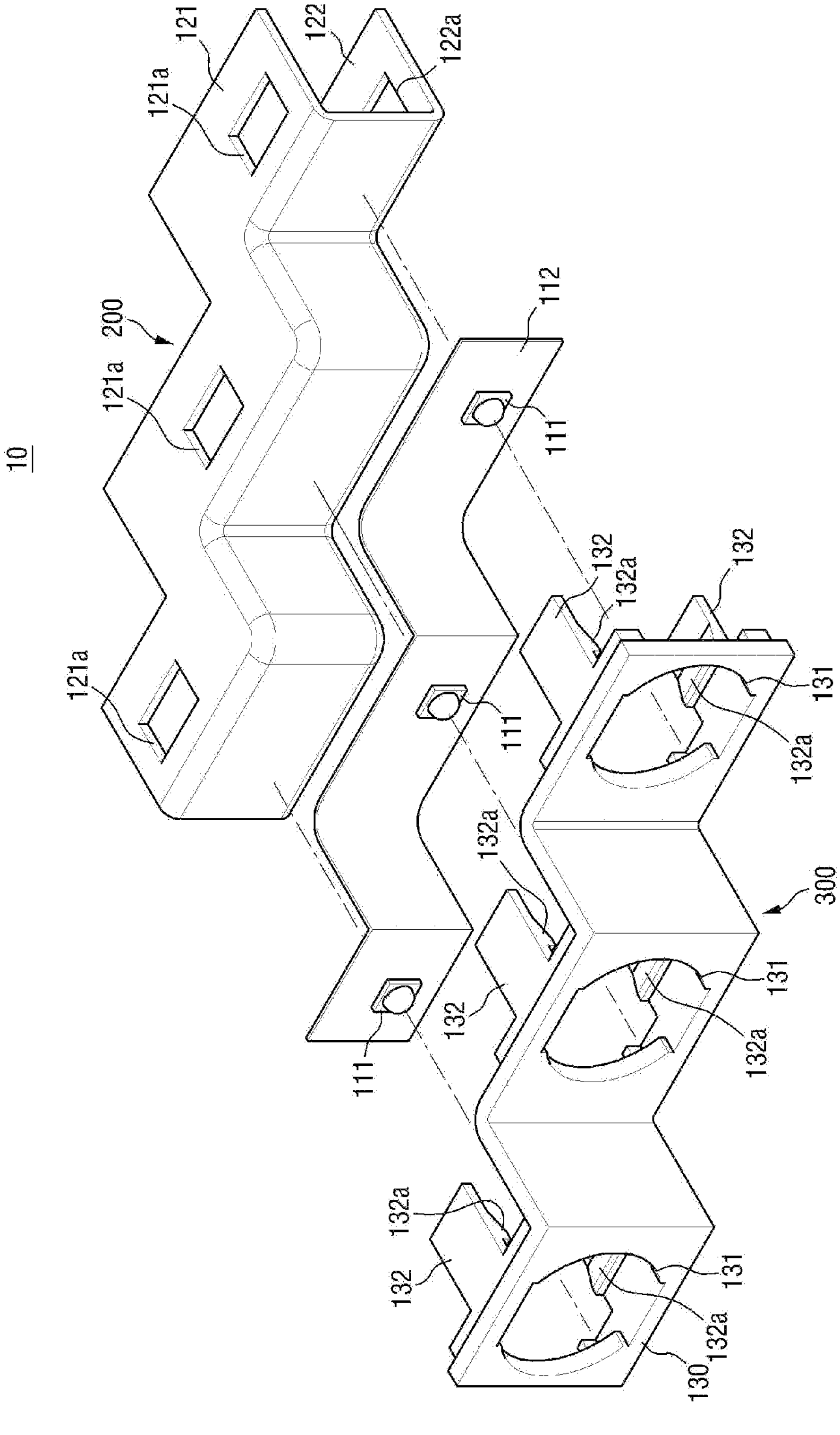

In the first exemplary embodiment of the present invention, one metal plate 120 and one fixing plate 130 are described as an example. However, the metal plate 120 and the fixing plate 130 may also be provided in a plurality, depending on the layout of the vehicle lamp 10 or the amount of light required. An example of a case when the metal plate 120 and the fixing plate 130 are provided in a plurality is shown in FIGS. 6 through 8. In FIGS. 6 through 8, reference numerals of some components will be omitted for the sake of simplicity.

Referring to FIGS. 6 through 8, the vehicle lamp 10 according to the first exemplary embodiment of the present invention may include a plurality of light source units 110, a plurality of metal plates, and a plurality of fixing plates. Each of the light source units 110, each of the metal plates, and each of the fixing plates may be structured and function as described above. In FIGS. 6 through 8, when a plurality of assemblies, each composed of a light source unit 110 and a metal plate 200, are coupled to one fixing plate 300 will be described as an example. Each of the light source units 110 may be mounted on a corresponding metal plate 200 to contact the metal plate 200. As described above, each of the light source units 110 may include a light source 111 and a PCB 112. The PCB 112 may be formed as a single piece on which a plurality of light sources 111 may be mounted, as shown in FIGS. 7 and 8. However, the present invention is not limited thereto, and the PCB 112 may also be formed as multiple pieces on which the light sources 111 are mounted to be coupled to the metal plates 200, respectively.

A plurality of apertures 131 may be formed in the fixing plate 300, and the assemblies of the light source units 110 and the metal plates 200 may be coupled to the fixing plate 300 formed as a single piece such that the light source units 110 may respectively be inserted into the apertures 131. In particular, when the assemblies of the light source units 110 and the metal plates 200 are coupled to the fixing plate 300 from behind the fixing plate 300, light emitted from each of the light source units 110 may pass through the fixing plate 300.

The fixing plate 300 may be shaped like a staircase composed of a plurality of steps formed in portions coupled to the metal plates 200, respectively. However, the shape of the fixing plate 300 is not limited to the staircase shape. Since the fixing plate 300 forms a portion of a bezel or housing of the vehicle lamp 10 or is coupled to the bezel or housing of the vehicle lamp 10, the shape of the vehicle lamp 10 may vary according to the shape of the fixing plate 300.

When the fixing plate 300 is staircase shaped, the shape of the fixing plate 300 may be adjusted to fit a corner portion of a vehicle by adjusting step heights, and the shape of the vehicle lamp 10 may be adjusted accordingly. Therefore, the degree of freedom of vehicle design may be improved. In particular, the PCB 112 which may be formed as a single piece and on which the light sources 111 are mounted may also be staircase shaped. The staircase shaped PCB 112 formed as a single piece may be a flexible PCB.

The metal plates 200 may be separated from each other as shown in FIG. 7. However, the present invention is not limited thereto, and the metal plates 200 may also be formed as a single piece as shown in FIG. 8. That is, when the fixing plate 300 is staircase shaped, the metal plates 200 may also be shaped like a staircase composed of a plurality of steps corresponding respectively to the steps of the staircase shaped fixing plates 300. In particular, when the metal plates 200 are formed as a single piece, they may be coupled to the fixing plate 300 as a unit. This may improve the ease of assembly of the vehicle lamp 10.

When the assemblies of the light source units 110 and the metal plates 200 are coupled to the fixing plate 300 formed as a single piece, the fixing plate 300 may include multiple pairs of elastic supports 132 that perpendicularly protrude from different positions on the rear surface of the fixing plate 300. In particular, each metal plate 200 on which a corresponding light source unit 110 is mounted may be inserted between a pair of elastic supports 132 to be coupled to the pair of elastic supports 132. Hook shaped coupling protrusions 132*a* may respectively be formed on the elastic supports 132, and coupling grooves 121*a* and 122*a* into which the coupling protrusions 132*a* are inserted may be formed in each of the metal plates 200.

When the metal plates 200 are formed as a single piece, the fixing plate 300 may have a plurality of elastic supports 132 formed at different positions on each step, as shown in FIG. 8. However, the present invention is not limited thereto. In other words, the fixing plate 300 may include two pairs of protruding elastic supports 132 respectively formed at both ends thereof, and the metal plates 200 formed as a singe piece may be coupled to the fixing plate 300 at both ends by the two pairs of elastic supports 132 formed at both ends of the fixing plate 300. In particular, the coupling grooves 121*a* and 122*a* may be formed in both ends of the metal plates 200 formed as a single piece to correspond to the coupling protrusions 132*a* formed on the two pairs of elastic supports 132 at both ends of the fixing plate 300, respectively. When both the metal plates 200 and the fixing plate 300 are staircase shaped, even when there is a difference between the steps of the metal plates 200 and the steps of the fixing plate 300, the metal plate 200 and the fixing plate 300 may be easily coupled to each other since the metal plates 200 and the fixing plate 300 are coupled only at both ends thereof.

In the first exemplary embodiment of the present invention, when a metal plate is coupled to a fixing plate from behind the fixing plate has been described above as an example. However, this case is merely an example used to help understand the present invention, and the present invention is not limited to this case. That is, the metal plate may be coupled to the fixing plate from in front of the fixing plate. When the metal plate is coupled to the fixing plate from a front of the fixing plate will hereinafter be described.

Figure 9:
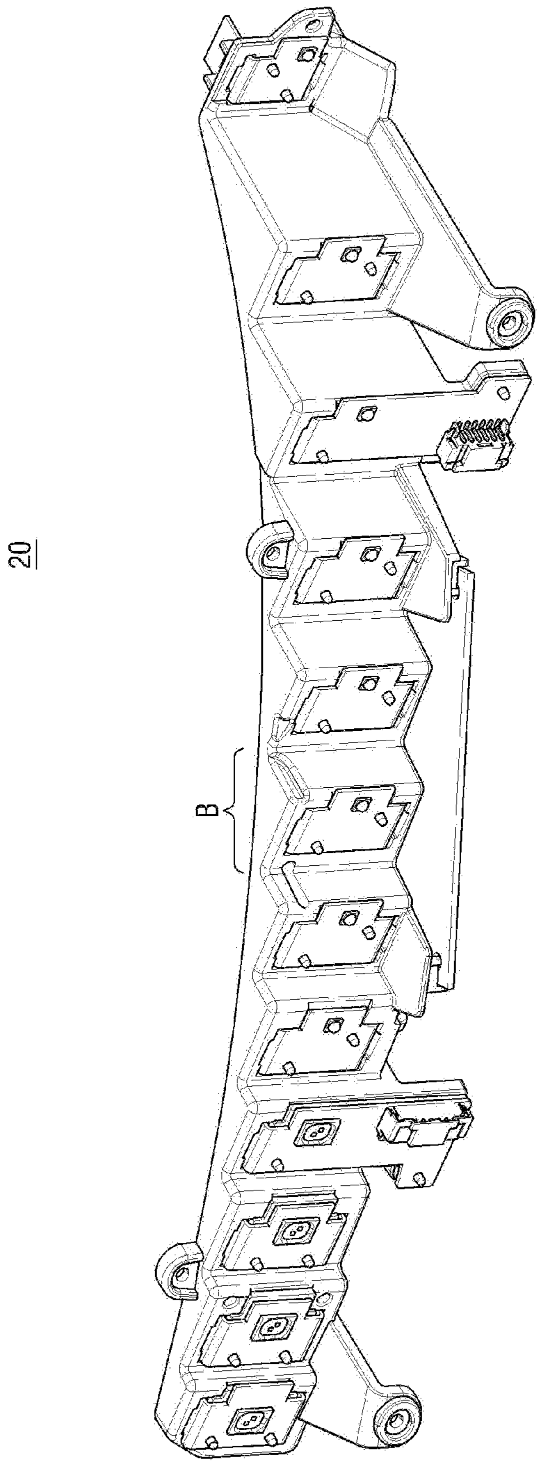
FIGS. 9 through 11 are exemplary views of a vehicle lamp according to an exemplary embodiment of the present invention.
Figure 10:
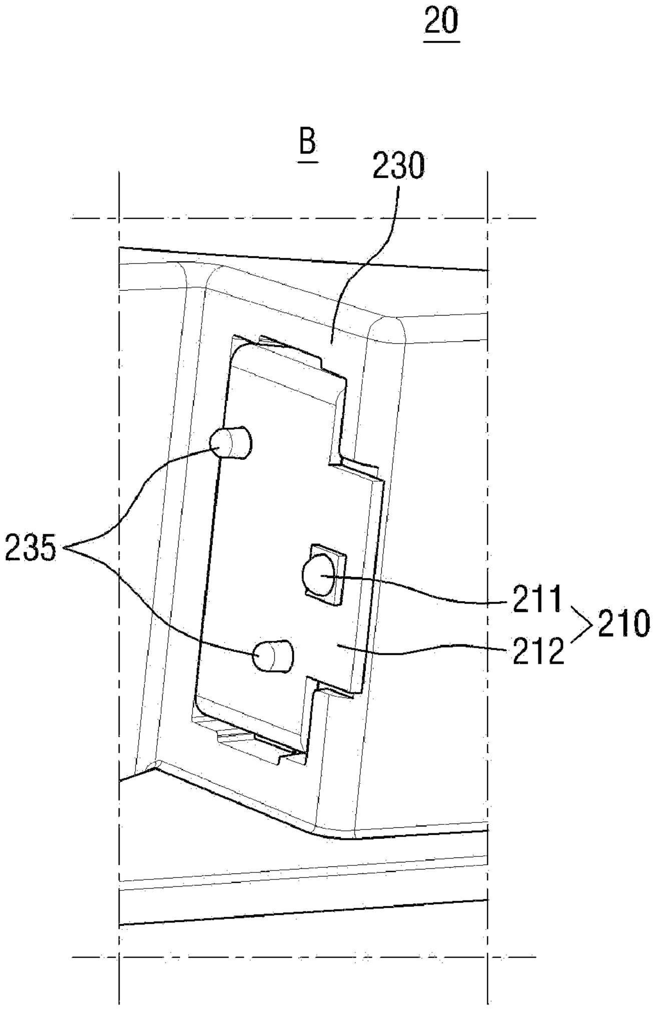
Figure 11:
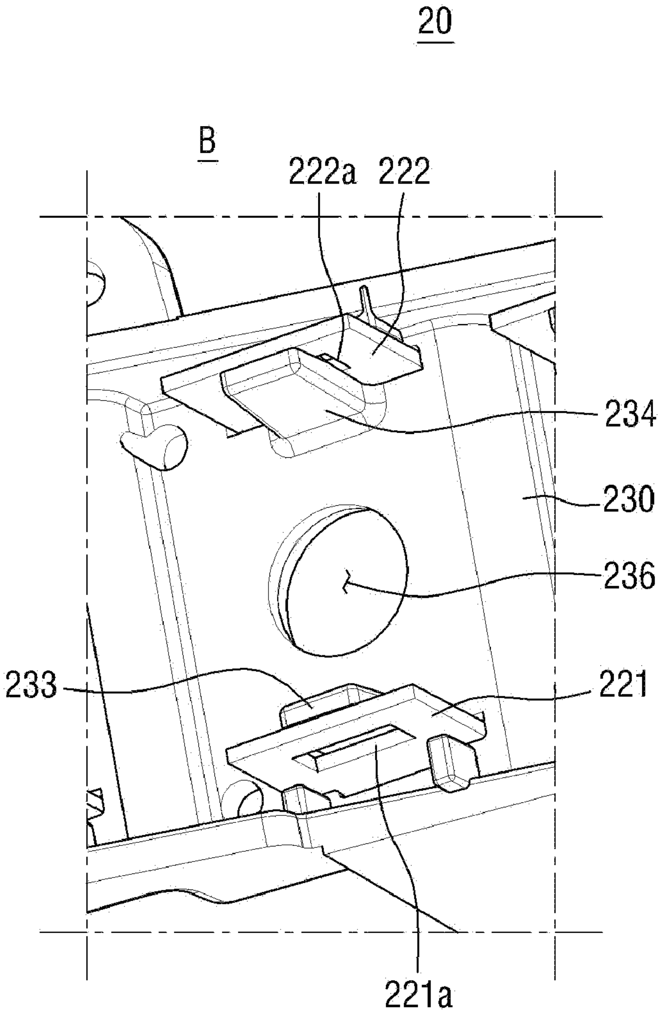
Figure 12:
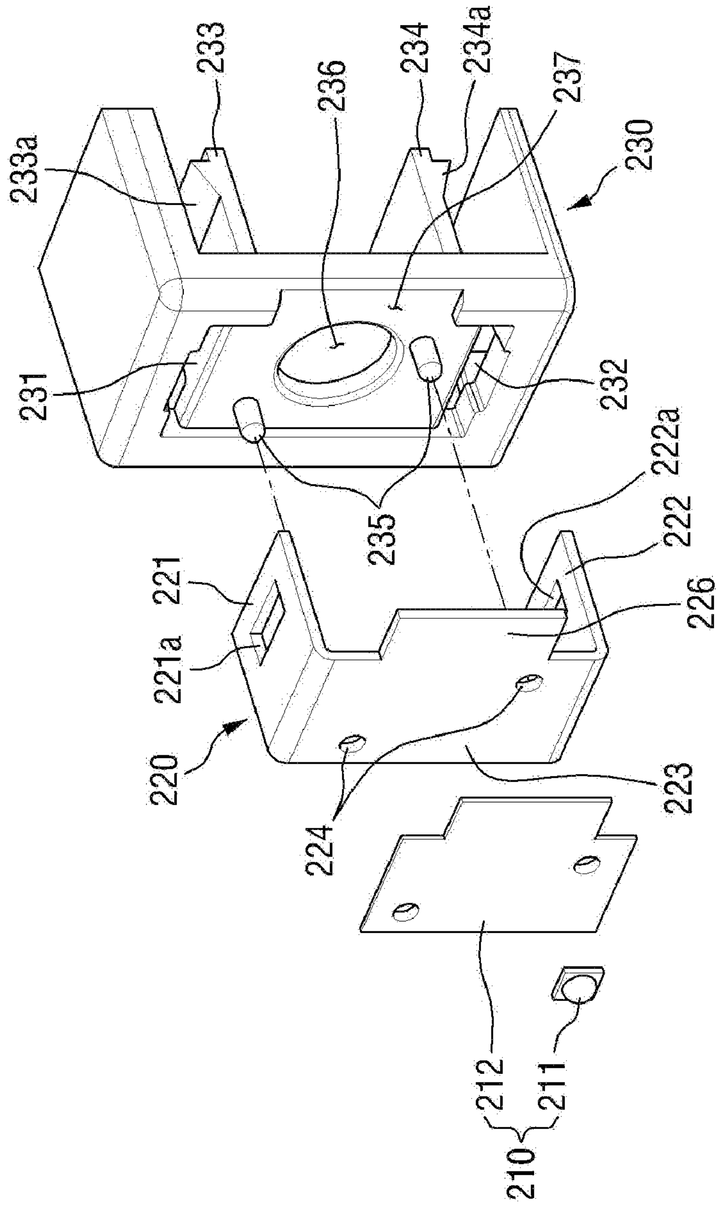
FIG. 12 is an exemplary detailed view of the vehicle lamp according to an exemplary embodiment of the present invention.

FIGS. 9 through 11 are exemplary views of a vehicle lamp 20 according to a second exemplary embodiment of the present invention. FIG. 12 is an exemplary detailed view of the vehicle lamp 20 according to the second exemplary embodiment of the present invention.

Figure 13:
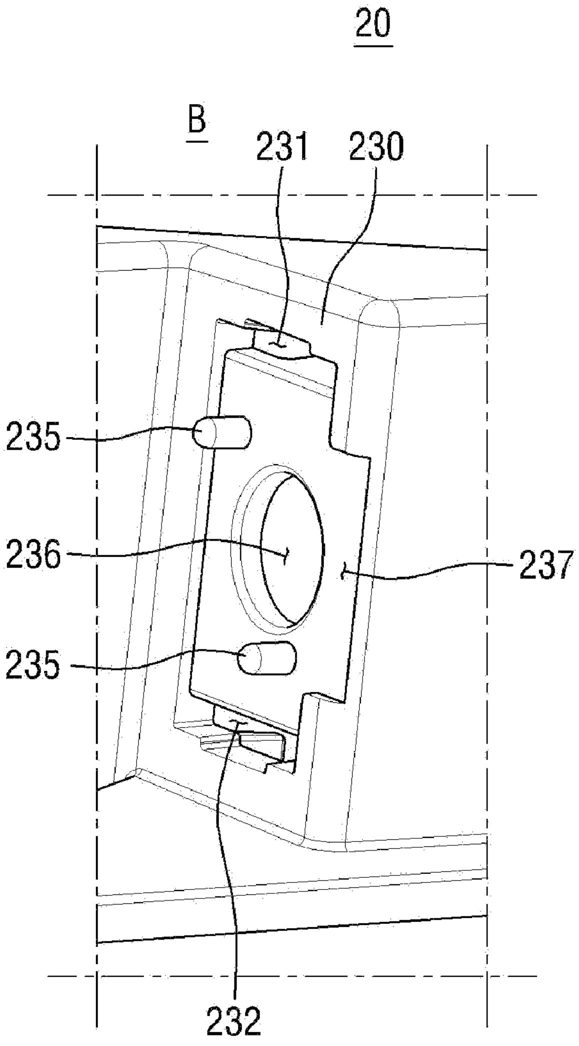
FIGS. 13 and 14 are exemplary views of a fixing plate according to an exemplary embodiment of the present invention.
Figure 14:
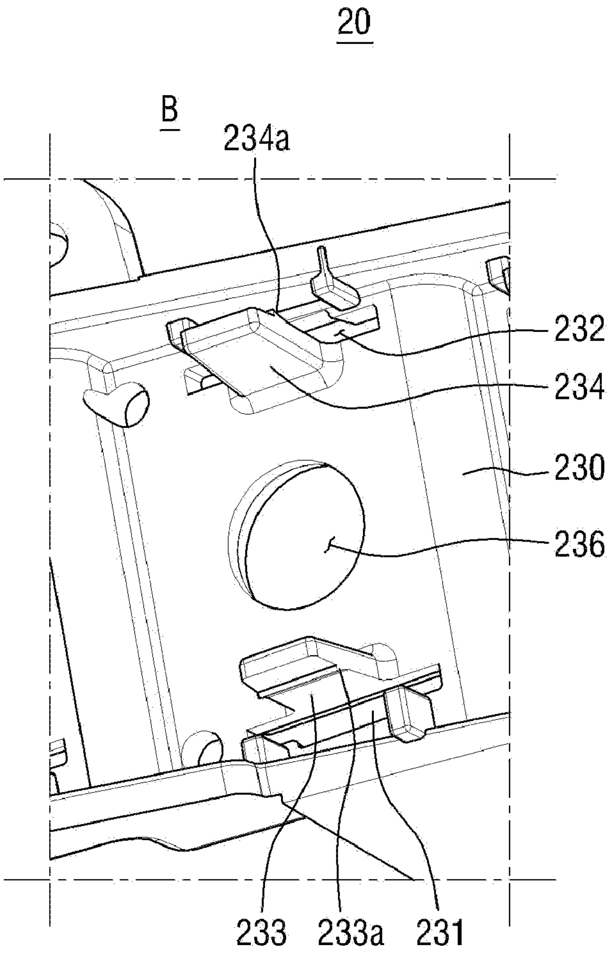

FIGS. 13 and 14 are exemplary views of a fixing plate 230 according to the second exemplary embodiment of the present invention. In particular, FIGS. 10 through 14 illustrate a portion B of FIG. 9. Referring to FIGS. 9 and 14, the vehicle lamp 20 according to the second exemplary embodiment of the present invention may include a light source unit 210, a metal plate 220, and the fixing plate 230.

The light source unit 210 may include a light source 211 and a PCB 212 onto which the light source 211 may be mounted. The light source 211 and the PCB 212 according to the second exemplary embodiment operate similarly to the light source 111 and the PCB 112 according to the first exemplary embodiment, and thus a detailed description thereof will be omitted.

The metal plate 220 may be coupled directly to the light source unit 210 and thus may receive heat generated by the light source unit 210. The heat transferred to a portion of the metal plate 220 which contacts the light source unit 210 may be transferred to substantially the entire metal plate 220, and the entire surface of the metal plate 220 may exchange heat with air. Accordingly, the heat generated by the light source unit 210 may be easily dissipated to the exterior of the vehicle lamp 20. The material and role of the metal plate 220 according to the second exemplary embodiment are similar to those of the metal plate 120 according to the first exemplary embodiment, and thus a detailed description thereof will be omitted.

The light source unit 210 may be coupled to the metal plate 220 by the PCB 212 which is attached to the metal plate 220 or fixed to the metal plate 220 by coupling members such as screws. When the PCB 212 is attached to the metal plate 220, an adhesive interposed between the PCB 212 and the metal plate 220 may be a type of TIM. Since the role of the TIM has been described above in the first exemplary embodiment of the present invention, a detailed description thereof will be omitted.

The metal plate 220 may be bent in a 'ㄷ' shape. Thus, the metal plate 220 may include two walls 221 and 222 which face each other and a connection surface 223 which connects the two walls 221 and 222. While the metal plate 220 may have two walls 221 and 222 as described in the second exemplary embodiment of the present invention, the present invention is not limited to this case. That is, the metal plate 220 may have one or more walls.

In the second exemplary embodiment of the present invention, the light source unit 210 may be mounted on the connection surface 223 of the metal plate 220, and the walls 221 and 222 may be coupled to the fixing plate 230. That is, the light source unit 210 and the fixing plate 230 may be mounted on and coupled to different surfaces of the metal plate 220, thus forming efficient coupling structures. In addition, the metal plate 220 may be coupled to the fixing plate 230 from a front of the fixing plate 230. Furthermore, the fixing plate 230 may include guide apertures 231 and 232 into which the walls 221 and 222 of the metal plate 220 are inserted. The two walls 221 and 222 of the metal plate 220 may be coupled respectively to the two guide apertures 231 and 232 disposed in a front surface of the fixing plate 230.

After the coupling of the two walls 221 and 222 of the metal plate 220 to the two guide apertures 231 and 232 of the fixing plate 230 is initiated, the two walls 221 and 222 of the metal plate 220 may move along guide passageways formed between elastic supports 233 and 234 disposed on a rear surface of the fixing plate 230 and walls of the fixing plate 230, respectively. Such a guide support shape may be required when the metal plate 220 is made of a flexible material such as aluminum to prevent the metal plate 220 from bending during coupling of the metal plate 220 to the fixing plate 230.

After the coupling of the metal plate 220 to the fixing plate 230 is initiated, when the process of coupling the metal plate 220 to the fixing plate 230 progresses to a certain degree through the above guide support shape, there may be a point where fixing grooves 224 formed in the connection surface 223 of the metal plate 220 contact fixing protrusions 235 formed on the front surface of the fixing plate 230. In particular, as the fixing protrusions 235 of the fixing plate 230 are inserted into the fixing grooves 224 of the metal plate 220, they may form a support structure that prevents the metal plate 220 and the fixing plate 230 from separating in directions other than a direction of a coupling axis of the fixing grooves 224 of the metal plate 220 and the fixing protrusions 235 of the fixing plate 230. In the second exemplary embodiment of the present invention, when two fixing grooves 224 and two fixing protrusions 235 are formed are described as an example. However, the present invention is not limited to this case, and the numbers and positions of the fixing grooves 224 and the fixing protrusions 235 can vary.

The fixing plate 230 coupled to the metal plate 220 may support the metal plate 220. The fixing plate 230 according to the second exemplary embodiment operate similarly to the fixing plate 130 according to the first exemplary embodiment, and thus a detailed description thereof will be omitted.

The fixing plate 230 may be easily coupled to the metal plate 220 by coupling protrusions 233a and 234a and coupling grooves 221a and 222a. In other words, the hook shaped coupling protrusions 233a and 234a may be formed on the fixing plate 230, and the coupling grooves 221a and 222a into which the coupling protrusions 233a and 234a are inserted may be formed in the metal plate 220. The metal plate 220 on which the light source unit 210 is mounted may be easily coupled to the fixing plate 230 by the coupling grooves 221a and 222a and the coupling protrusions 233a and 234a inserted into the coupling grooves 221a and 222a. In addition, the fixing plate 230 may include a pair of elastic supports 233 and 234 that protrude perpendicularly from the rear surface thereof. In the second exemplary embodiment of the present invention, a pair of elastic supports 233 and 234 may be formed since the metal plate 220 includes two walls 221 and 222. However, the present invention is not limited to this case, and the number of elastic supports 233 and 234 may vary according to the number of walls of the metal plate 220.

When the metal plate 220 is bent in a 'ㄷ' shape as described above, the metal plate 220 may be installed to allow the two walls 221 and 222 of the metal plate 220 to contact the elastic supports 233 and 234, respectively. Accordingly, the two walls 221 and 222 of the metal plate 220 may be coupled to the elastic supports 233 and 234, respectively. The coupling protrusions 233a and 234a may respectively be formed on the pair of elastic supports 233 and 234, and the coupling grooves 221a and 222a may respectively be formed in the two walls 221 and 222 of the metal plate 220.

Since the elastic supports 233 and 234 have elasticity, the position of an end of each of the elastic supports 233 and 234 may change within a certain range. Therefore, when the metal plate 220 is pushed into the space between the elastic supports 233 and 234, the elastic supports 233 and 234 may deform and then return to an original shape to allow the coupling protrusions 233a and 234a to be easily inserted into the coupling grooves 221a and 222a of the metal plate 220.

In the second exemplary embodiment of the present invention, when the coupling grooves 221a and 222a are formed in the two walls 221 and 222 of the metal plate 220 and when the hook shaped coupling protrusions 233a and 234a inserted into the coupling grooves 221a and 222a are formed on the pair of elastic supports 233 and 234 are described as an example. However, the present invention is not limited to this case, and the opposite case is also possible. That is, the hook shaped coupling protrusions 233a and 234a may be formed on the metal plate 220 instead of the pair of elastic supports 233 and 234, and the coupling grooves 221a and 222a into which the coupling protrusions 233a and 234a are inserted may be formed in the fixing plate 230 instead of the metal plate 220.

Figure 15:
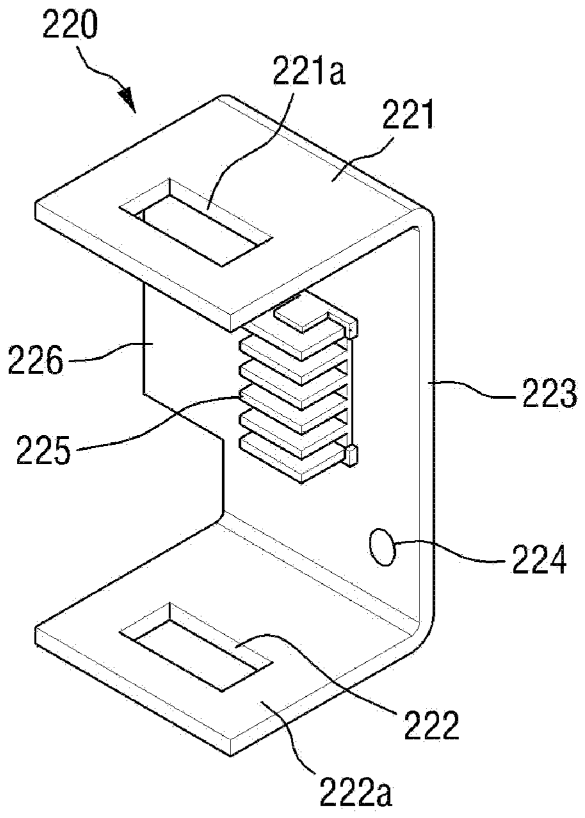
FIG. 15 is an exemplary view of heat dissipation pins formed on a metal plate according to an exemplary embodiment of the present invention.

In the second exemplary embodiment of the present invention, when the metal plate 220 operates as a heat sink which dissipates heat generated from the light source unit 210 to the exterior of the vehicle lamp 20 is described as an example. However, the present invention is not limited to this case, and the metal plate 220 may further include a plurality of heat dissipation pins 225 formed between the two walls 221 and 222 to protrude from the connection surface 223 as shown in FIG. 15. In particular, the heat dissipation pins 225 may further increase the area of the surface of the metal plate 220 which contacts air, thereby further improving the heat dissipation performance of the metal plate 220. In addition, the heat dissipation pins 225 may be formed to allow the pins to be inserted into a central aperture 236 formed in the fixing plate 230 when the metal plate 220 is coupled to the fixing plate 230 from a front of the fixing plate 230.

The central aperture 236 of the fixing plate 230 into which the heat dissipation pins 225 are inserted when the metal plate 220 is coupled to the fixing plate 230 from a front of the fixing plate 230 may operate as a passageway through which heat generated from the light source unit 210 may be dissipated to the exterior of the vehicle lamp 20. Even when the heat dissipation pins 225 are not additionally formed on the connection surface 223 of the metal plate 220, the central aperture 236 may operate as a passageway through which the heat generated from the light source unit 210 may be dissipated to the exterior of the vehicle lamp 20.

A slit region 237 may additionally be formed at a side of the front surface of the fixing plate 230 to prevent the movement of the light source unit 210 after the metal plate 220 is coupled to the fixing plate 230. In particular, a slit surface 226 may also be formed at a side of the connection surface 223 of the metal plate 220 to further prevent the movement of the light source unit 210 when the fixing plate 230 and the metal plate 220 are coupled to each other by contacting the slit region 237 of the fixing plate 230.

When a plurality of light source units 210 and a plurality of metal plates 220 are coupled to one fixing plate 230, the fixing plate 230 may be shaped like a staircase composed of a plurality of steps formed in portions coupled to the metal plates 220, respectively. As in the first exemplary embodiment, in the second exemplary embodiment, each of the PCB 212 and the metal plate 220 may be formed as a single piece or as multiple pieces. Although the first exemplary embodiment and the second exemplary embodiment have been described separately, some components of the first and second embodiments may be used interchangeably.

For example, the slit region 237 and the slit surface 226 or the central aperture 236 of the second exemplary embodiment may be applied to the first exemplary embodiment. Other structurally applicable components of the first and second embodiments may also be used interchangeably, in addition to the slit region 237 and the slit surface 226.

Embodiments of the present invention provide at least one of the following advantages. In a vehicle lamp according to the present invention, a metal plate having a heat dissipation function may be simply coupled to a fixing plate. Therefore, parts of the vehicle lamp may be easily and simply assembled. In addition, since an additional member (such as a plastic bracket) designed for assembling the vehicle lamp and a process using heat are not required, the number of parts and processes may be reduced, thus reducing costs and improving productivity.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A vehicle lamp comprising:

a light source unit configured to emit light;

a metal plate onto which the light source unit is mounted on a surface thereof is configured to dissipate heat generated from the light source unit; and a fixing plate coupled to the metal plate and configured to support the metal plate, wherein a coupling protrusion is formed on any one of the metal plate and the fixing plate, a coupling groove coupled to the coupling protrusion is formed in the other one of the metal plate and the fixing plate, and the metal plate comprises a plurality walls that face each other and a connection surface which connects the walls, wherein at least one of the walls of the metal plate is coupled to an elastic support that protrudes from the surface of the fixing plate, and wherein the fixing plate comprises one or more fixing protrusions which are inserted into one or more fixing grooves formed in the metal plate.

2. The vehicle lamp of claim 1, wherein the light source unit comprises:

a light source which is a semiconductor light emitting device; and a printed circuit board (PCB) onto which the light source is mounted, wherein the PCB is mounted on the surface of the metal plate to contact the surface of the metal plate.

3. The vehicle lamp of claim 1, wherein the metal plate is made of aluminum or an aluminum alloy.

4. The vehicle lamp of claim 1, wherein the metal plate further comprises a plurality of heat dissipation pins that protrude from the connection surface.

5. The vehicle lamp of claim 1, wherein the coupling protrusion is formed on any one of the at least one of the walls and the elastic support, and the coupling groove is formed in the other one of the at least one of the walls and the elastic support.

6. The vehicle lamp of claim 1, further comprising a central aperture formed in the connection surface of the fixing plate and configured to dissipate the heat generated from the light source unit.

7. The vehicle lamp of claim 1, wherein the at least one of the walls of the metal plate is inserted into at least one guide aperture formed in the fixing plate.

8. The vehicle lamp of claim 1, wherein the metal plate comprises a slit surface extending from a side of the connection surface, wherein the slit surface is mounted on a slit region formed in the fixing plate.

9. The vehicle lamp of claim 1, wherein the fixing plate comprises an aperture into which the light source unit is inserted when the metal plate and the fixing plate are coupled to each other.

* * * * *